United States Patent [19]

Hamada

[11] 3,999,277
[45] Dec. 28, 1976

[54] METHOD OF MANUFACTURING ASSEMBLY-TYPE CAMSHAFT

[76] Inventor: Hiroshi Hamada, No. 614-2, Segasaki; Urawa, Saitama, Japan

[22] Filed: Jan. 26, 1976

[21] Appl. No.: 652,458

Related U.S. Application Data

[62] Division of Ser. No. 485,185, July 2, 1974, abandoned.

[52] U.S. Cl. ............................ 29/447; 29/467; 74/567
[51] Int. Cl.² ........................................ B23P 11/02
[58] Field of Search ................. 29/447, 469, 467; 74/567

[56] References Cited

UNITED STATES PATENTS

| 303,317 | 8/1884 | Ostrom | 74/567 |
| 1,390,949 | 9/1921 | Yassenoff | 74/567 |
| 2,006,738 | 7/1935 | Kilmer | 29/447 UX |
| 2,817,248 | 12/1957 | Motzet et al. | 74/567 |
| 2,892,254 | 6/1959 | Garvin | 29/467 X |
| 2,899,742 | 8/1959 | Wilson | 29/447 |
| 3,216,095 | 11/1965 | Kurtz et al. | 29/447 X |
| 3,724,059 | 4/1973 | Celovsky | 29/447 X |
| 3,831,261 | 8/1974 | Gell | 29/467 |

FOREIGN PATENTS OR APPLICATIONS

| 275,842 | 8/1927 | United Kingdom | 74/567 |

Primary Examiner—Charlie T. Moon
Attorney, Agent, or Firm—Beveridge, DeGrandi, Kline & Lunsford

[57] ABSTRACT

This invention relates to camshafts of the assembly type and the manufacture thereof, in which a shaft part and cam parts are first formed separately, as individual parts of simple configuration. The cam parts are then freely mounted on the shaft part, then indexed to the desired axial and angular positions, and temporarily secured to the shaft by a fastening medium applied through an indexing hole through each cam and engaging the shaft, and thereafter the cams, so mounted and indexed, are permanently secured to the shaft by welding. The indexing hole also can function as a lubricant reservoir.

11 Claims, 9 Drawing Figures

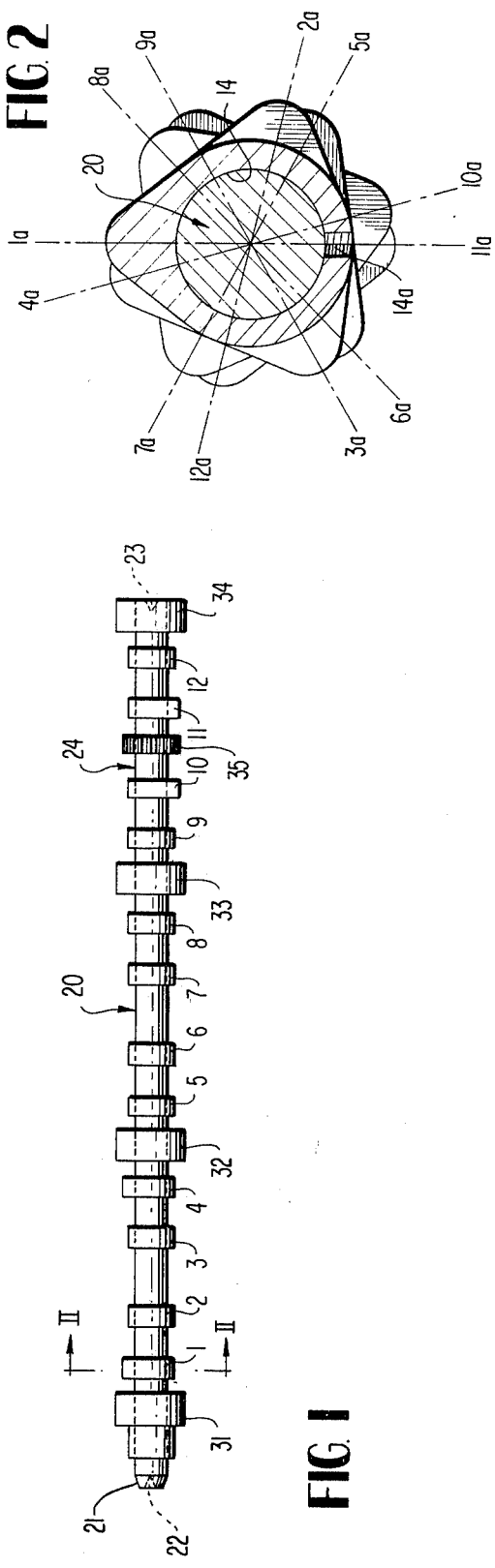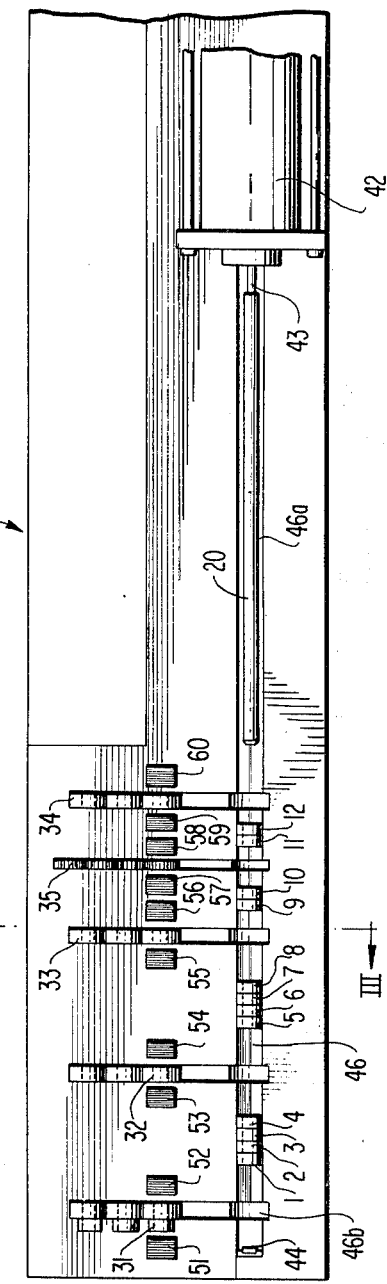

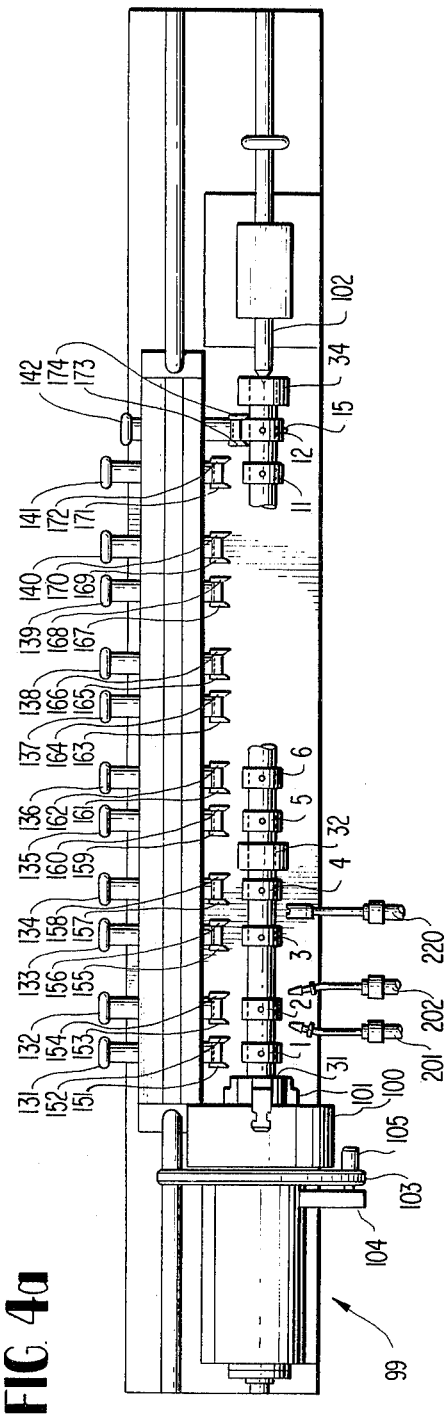

METHOD OF MANUFACTURING ASSEMBLY-TYPE CAMSHAFT

This is a division of application Ser. No. 485,185 filed July 2, 1974, now abandoned.

BACKGROUND OF THE INVENTION

In conventional methods of manufacture, a camshaft is a complex piece of metal defining a shaft portion integral with cams, journals and a gear, and is made by casting or forging to the desired configurations and dimensions. Such camshaft takes a long time to make and, therefore, entails high manufacturing costs; even when it is successfully forged or cast and machined, it has the drawback of being more liable to breakage due to internal flaws.

To overcome these drawbacks, the present invention proposes to build a camshaft with pre-machined parts of simple configurations, namely, individual cam parts, journal parts, a gear part and a shaft part, the four principal components of a camshaft. According to the proposed method, each camshaft part may be made from any desired material specifically tailored to its specific duty, and can be accurately assembled to constitute a build-up camshaft with its cams and journals occupying the exact angular and axial positons dictated by the design of the mechanism associated with it in service. Build-up camshafts manufactured according to this invention have been employed in practical engines for driving the valve mechanism thereof, resulting in a finding that these camshafts are not only satisfactory functionally but also endowed with the additional advantages that the profile surfaces of cams, as well as the riding faces of tappets, are less liable to wear, and the occurrence of valve mechanism trouble is minimized.

The high resistance of the cams and gear to wear is accounted for by the fact that, because cam parts and the gear according to the proposed method are originally individually machined parts made from annular or ring-shaped workpieces of a different material than the shaft, the grain structure of cam and gear surfaces can be more refined and, since the workpieces are smaller in bulk size than otherwise, they lend themselves to more effective surface treatments, such as hardening.

The proposed method of assembly is not based on the press-fitting or shrink-fitting of cams to a shaft part to introduce some interference in the fit, which presents considerable difficulty of accurately indexing the cams to their exact angular positions at the time of fitting the cams to the shaft and, therefore, requires the use of an indexing device, which is necessarily complicated because of the high degree of accuracy demanded in positioning the cams on the shaft. In some prior instances of built-up camshaft manufacture where the cams were of steel, press-fitted to the shaft, and were additionally secured to the shaft by welding, the subsequent hardening by high-frequency induction heating caused weld beads to develop cracks during rapid chilling due to the stresses in that portion of metal in the cam affected by the interference fit. Such cracks, however, can be avoided by eliminating the interference fit.

Accordingly, it is the object of this invention to provide an improved assembly type crankshaft and method of manufacturing same.

Other objects and advantages of the invention will become apparent from the following detailed description, taken in conjunction with the annexed sheets of drawings, on which:

FIG. 1 is a side view showing a camshaft embodying this invention.

FIG. 2 is a sectional view taken along the line II—II of the FIG. 1.

FIG. 3a is a schematic plan view of an assembly bench for mounting each part of the camshaft on a shaft part.

FIG. 3b is a side view taken along the line III—III of the FIG. 3a.

FIG. 4a is a schematic plan view of a device for indexing cams on the shaft according to this invention.

FIG. 4b is a side view of the device in FIG. 4a partly showing in section.

FIG. 5 is a side view of a cam indexed on the shaft, partly showing in section.

FIG. 6 is a side view, partly in section, showing a modified cam positioning fixture holding a cam in an indexed position.

FIG. 7 is a side view similar to FIG. 5 and showing another embodiment of this invention.

The manufacturing method of this invention can be applied in several ways; each way will be explained in the order of preference, starting with the first embodiment shown in FIG. 1, in which the camshaft shown is the one recently placed in commercial production for a 6-cylinder diesel engine.

Referring to FIG. 1, a cylindrical shaft 20 is made from cold-drawn cold-finished steel bar stock. The bar stock is cut to a proper length in an automatic sizing cutter. The cut bar is then worked in a special automatic combined-cutting machine to provide an end chamfer 21 and centers 22 and 23 simultaneously, resulting in a completed shaft part. FIG. 2 shows indexed positions of each cam 1 through 12, in which lines 1a through 12a passing through a center 0 of the shaft 20 designated the ridge or lobe portions of each cam.

Cam parts 1 through 12, inclusive, are preferably formed from steel. Since they are individual parts, the original cam shape can be dimensioned relatively accurately, with a minimum of grinding allowance. The original cam shape is annular, and is obtained by means of a forging press. In the actual production of the camshaft of FIG. 1, the grinding allowance on the cam profile is but 0.02 inch on one side. The forged cam stock is then machined to the specified width by working only on its burred side in a dial-index type transfer machine. In the next machining operation a cylindrical bore 14 for receiving the shaft part is made in a core drill machine. This is followed by another operation, at which a tap hole 14a for threading is drilled. In the last operation, the tap hole 14a is threaded with a 3/16 inch tap, thus completing the machining of the cam part. The bore 14 for receiving the shaft part 20 is sized large enough to provide a radial clearance between 0.002 inch and 0.008 inch in the fit so that each cam may be freely positioned on shaft 20.

This loose fit makes easier the mounting of the cam parts on the shaft part, and, moreover, presents additional advantage in that no cracks develop in th weld beads laid at the fit when the camshaft undergoes a process of hardening by high frequency introduction heating and rapid cooling after welding the cam parts to the shaft part. Another reason for the loose fit is that, according to the results of the experimental tests conducted by this inventor on assembled and welded camshafts in which the cams are mounted with a loose fit, a cam of about 0.10 inch or more in thickness at and near the hole 14 passing the shaft part retains strength high enough for a camshaft and has a higher critical speed of rotation in regard to torsional and flexural vibration and resonance, as compared with integral camshafts made from forgings or castings, if the cam is secured to the shaft by fillet welding. The high rigidity and strength of the camshaft according to this invention is evidently accounted for by the fact that the shaft part is rounder and straighter because it is shaped out of cold-finished bar stock, and that its cam parts, journal parts, as well as its gear, are separately machined and finished to make for a better dynamic balance in the camshaft.

Journal parts 31 through 34, inclusive, and a gear part 35 are additional mounted parts. They are made by cutting black-skinned steel bar stock into pieces sized to a rough width; machining the cut pieces into ring form in a 10-spindle boring machine, leaving a cutting allowance of 0.06 inch on each ring; turning the rings in a combination of two automatic feeding units and a single-function automatic lathe to finish the width and outside diameter of each ring, leaving a diametral grinding allowance ranging from 0.02 inch to 0.028 inch. The hole in each ring for passing the shaft part 20 is finished for a dimension that provides an interference of 0.001 in to 0.005 inch with the cold-finished diameter of the shaft part 20. Alternatively, the journal parts and gear part may be dimensioned to provide a loose fit on the shaft part 20. In the particular camshaft in consideration, an interference fit is used on these parts for the reason that they are truly round parts and do not require angular indexing at the time of mounting them on the shaft part, nor welding to secure them, hence can be easily shrink-fitted to the shaft. The gear part 35 to be machined in the single-function automatic lathe mentioned above is already forged in toothed form and all gear parts are hobbed in advance of assembly by stacking eight gear blanks and hobbing them together in a hobbing machine.

As described, the individual parts of the camshaft, namely, the shaft part 20, the cam parts 1 through 12, the journal parts 31 through 34, and the gear part 35 are separately formed. The method of fitting the cams, the journals and the gear part to the shaft part 20 will be described by referring to FIG. 3a and FIG. 3b, in which an assembly table 40 for conveniently mounting the parts on the shaft part 20 is shown. It should be noted that the assembly table 40 is essentially a bench whose top 40a is ramped and provided with a series of guiding, locating and positioning recesses serving as grooves, ways and chutes, and is equipped with means of heating, cooling, motion stopping, ramming and ejecting. The construction of the device will become clear as the description of the mounting sequence proceeds hereunder:

Firstly, cams are placed in the long groove 46, in four groups with cams 1, 2, 3, and 4 for the first group, cams 5, 6, 7, and 8 for the second, cams 9 and 10 for the third, and cams 11 12 for the fourth. Secondly shaft part 20 is placed in the extended groove portion 46a of groove 46, less deep than the groove 46 in which the cams are positioned. Thirdly, journal parts 31 through 34 and the gear part 35, all having been heated to a proper temperature level for shrink fitting, roll down the guideways 40b into the accurately shaped cradles 46b in said groove 46 to take their exact positions. How journals and gear part may be supplied to the groove 46 will be seen in FIG. 3; above the ramp, rows of the journal parts are in the chutes 40c, each row being blocked by a shiftable stopper finger 41. A total of five sets of induction heaters each consisting of two coils are provided on the ramp 40a to heat the parts held up by the stopper fingers 41; induction coils 51 through 60 in pairs receive energizing current of such a magnitude as will respectively heat the journal parts 31 through 34 and gear part 35 to a temperature level of about 600° C. within 1 minute of energization; when this temperature level is reached, a relay senses it and operates the finger stopper 41 to release one part in each chute; thus, the five parts, four journals and one gear, roll down simultaneously into their positions along the groove 46. Fourthly, an air cylinder 42 operates to extend its piston rod 43, thereby pushing the shaft 20 along the groove and through the journals 31–34, gear 35 and cams 1–12, until its forward end meets an anvil 44 located at the end of the groove 46. Needless to say, the cradles 46b for receiving the journals and gear and the groove 46 for holding the cams and shaft are all so dimensioned as to make the mounting holes of journals, gear and cams concentrically positioned and locate the journals and gear at the exact positions lengthwise on the shaft when the shaft has been fully inserted as above. Fifthly, cooling water is poured onto the hot journals and gear to shrink-fit them to the shaft. Lastly, a vertical ejector cylinder 45 operates to eject the camshaft thus far partially assembled out of the assembling groove 46. The cams 1–10 at this stage are loose on the shaft 20.

The next stage of the camshaft manufacture according to this invention is the indexing and setting of the mounted cam parts to the shaft part. This is accomplished with set screws, 3/16 inch in nominal size, and by operating a special-purpose combination unit consisting of an automatic feed screw driving machine and an automatic indexing device. However, to facilitate understanding the indexing and setting process, manually operated devices will be described here by referring to FIG. 4, wherein an indexing device is shown in two views (a) and (b).

Referring to FIG. 4, the partially completed camshaft 20, which has emerged from the assembling bench of FIG. 3, is transferred to a table 99 and held in an indexing device 100 by its chuck 101 in the workhead and also by center 102. Chuck 101 is provided with an index plate 103 having 12 index holes 111 through 122; these holes are distributed in a circular pattern and correspond to the desired angular cam positions numbered 1a through 12a in FIG. 2. Each of these holes can be aligned with the holding point 104 provided on the workhead by means of an index pin 105.

Twelve aligners 131 through 142 are distributed along-side of the camshaft in place at intervals corresponding to the specified intervals of cams on the shaft. These intervals are dimensioned from the reference face, which is taken on the exposed radial end faces of journal 31 in the chuck 101. Each aligner has its axis at the elevation of the center of the workhead chuck 101. The forward end of each aligner has a V-shaped notch to exactly locate the cam lobe apex angularly on the shaft. The V-notch end of each aligner is sided by two guide plates, there being a total of 24 guide plates numbered 151 through 174. These guide plates are in pairs, and each pair sandwiches its corresponding cam to accurately locate it at the desired axial position dimensioned from said reference face of journal 31.

Supposing that the index pin 105 is in hole 122, which means that cam 12 is to be indexed, aligner 142 is advanced to hold the apex of cam 12 by its V-notch and sandwich this cam by its guide plates 173 and 174. After this has been carried out, a set screw 15 (FIG. 5) is then run into the indexing hole 14a provided in the cam to tentatively set it on the shaft 20.

After setting the cam 12, aligner 142 is retracted and the index plate 103 is turned to the next position. As index plate 103 rotates, the shaft 20 also turns, carrying the cam 12 with it; the other cams, not yet set, merely slide on the shaft. Repeating this manner of tentatively setting the respective cams 12 times will index and set the 12 cams each time by aligning the hole in index plate 103 to the holding point 104 by means of index pin 105. In the example illustrated, guide plates 151 through 174 for locating the cams at the specified intervals along the shaft are secured to the aligners 131 through 142, but it is obvious that these guide plates may be separate from the aligners and can be actuated independently to perform the function already explained.

The relationship between each cam on shaft 20 and its set screw 15 will be explained in detail by referring to FIG. 5. As stated, each of cams 1 through 12, inclusive, has a tapped hole 14a in the lowest part of its profile. Into hole 14, which was formed at the previous machining station, set screw 15 is fitted by driving. These cams are to be fixated to shaft 20 by driving respective set screws into them. This driving operation can be obviously accomplished by a known automatic screw driving machine, not shown, as mentioned before.

The camshaft thus far assembled unergoes a welding process in the subsequent step, which will be described by referring again to FIG. 4, wherein are welding torches 201 and 202 are schematically shown to illustrate the welding operation. In the illustrated instance, are welding torches are set to weld on both sides of the cam 2. It will be readily seen that, where as many pairs as there are cams, of such welding torches are provided to weld in the indicated manner, all of the cam parts can be concurrently secured to the shaft by welding during one rotation of the shaft.

As to the weldment to be made in this manner, a weld bead of about 0.1 inch in throat is preferred. The present inventor obtained satisfactory results from a welding process effected with a shaft of 1.1 inches in diameter by making one rotation of it in 10 seconds while a welding current of 150 amperes was passed at 18 volts through a welding electrode or wire of 0.04 inch in diameter in a mixed shielding atmosphere of 95% $CO_2$ and 5% argon. This welding procedure has been found to result in a thermal distortion, in the as-welded camshaft, of less than 0.012 inch in average as half the deflection read at the middle of the shaft length, where the overall length of the camshaft is, for instance, 34 inches, and provide clean, neat beads at the welded corners.

It should be noted here that, as far as the sequence of manufacturing steps is concerned, the assembled and welded camshaft being considered for the purpose of explaning this invention corresponds, in its form after the above welding process, to the camshaft forging or casting emerging from the shaping process of a conventional integral camshaft manufacturing method. At this phase of manufacture, the cost of the assembled and welded camshaft is only 55% of the cost of the camshaft produced from a forging or casting. The saving of as much as 45% is achieved according to this invention because it is based on (1) the use of commercially available bar stock, from which the shaft and journals are obtained by relatively simple machining, (2) the machining of cam parts out of closely shaped forgings which are small in bulk and easy to form in a forging press, and (3) by the assembling and welding techniques which the present method permits and which can be readily implemented, as is evident in the foregoing description, by automatic devices.

The camshaft ejected from the automatic welding station is still a workpiece, ready to undergo the final working process which includes the previously-described process of hardening by high-frequency induction heating and rapid cooling. It will be recalled that the camshaft has already been centered and built to the dimensional specifications as far as the spacing of mounted parts is concerned, its journal parts having been machined slightly oversize to present an allowance for finishing by precision grinding. No further cutting operations are required. Before grinding, the camshaft needs straightening, which is the first step of the final working process, and is accomplished in conventional manner in a multi-roll straightening machine, in which the rolls ride on the exposed O.D. parts of the shaft part 20 and apply radial pressure to the shaft to effect its straightening. This technique is particularly effective because the shaft part 20 was originally a cold-finished steel bar. Experience tells that, according to this invention, camshafts with an overall length of 39.7 inches, for instance, give the average deflection reading of 0.025 inch, which is a value extremely small, and even this much deflection can be quickly corrected in the multi-roll straightening machine. After straightening, the camshaft is finished by precision grinding; this grinding operation is of the same plunge-cutting type as is usually performed on the conventional integral camshaft that has been turned for roughing, and therefore will be omitted from the description.

Mention will be again made of the set screw 15 used in setting the cam parts at the time of mounting and indexing these parts to the shaft part in the device shown in FIG. 4. After welding on the camshaft in the automatic welding station, and removing weld spatters in a power brushing machine, in which a rotary brush unit extending along the camshaft cleans all weldments by brushing simultaneously, the screws 15 are loosened and removed from the cams in place. This removal can be accomplished in an automatic device similar in construction to the one shown in FIG. 4 but designed to perform loosening operation instead of tightening operation.

According to another modification of this invention, recessed-head screws 15 may be used for tentatively setting the cams at the time of cam indexing, and the indexing hole provided in each cam may be so tapped that the head of the recessed screw fully run in will stay below the base-circle surface of the respective cam, presenting a depression.

In the camshaft of FIG. 1 under consideration, the set screws 15 are removed from the cams after all-around welding because this manner of welding was thought, when this invention was evolving, to give to the camshaft such high strength as to require no dependence upon the securing force of the screws. The actual service in practical engines of the assembled camshafts manufactured according to this invention, from which the set screws have been removed from the cams, have not only proved the validity of the above thought but also produce unexpectedly a desirable by-effect with respect to lubrication of the cam surface. It is generally believed that the cams of a camshaft and the associated tappet are subjected to maximized wearing action when starting a cold engine. In such an engine, the sliding surfaces of these valve-mechanism parts are relatively dry of oil, and it takes some time for the lubricating system of the engine to start delivering oil to them. Under this condition, oil is retained in the indexing hole of each cam of the camshaft according to this invention; the oil flows out, as the valve mechanism starts moving, to lubricate the sliding surfaces of the cams and tappets. In other words, the indexing holes, from which the screws have been removed, act as if they are reservoirs of oil. It is for this reason that, according to this invention, the screws used in the cam indexing and setting during manufacture are to be removed or provided with a recessed head.

Another embodiment of this invention based on the use of a holding fixture instead of the set screw for each cam will be explained by referring to the FIG. 6 in which holding fixture 210 is substituted for each of the cam aligners 131–142 on the indexing table 99 shown in FIG. 4a. Fixture 210 is a two-jaw clamping device having a screw 212, guide pin 213, and indexing pin 216. Screw 212 extends threadedly through two jaws 214 and 215 shaped to embrace the lobe of a cam, one of the twelve 1 through 12 of the camshaft under consideration. Screw 212 is rotated by means of handle 211 and, when so rotated, causes the two jaws 214 and 215 to move away from or come closer to each other, depending on the direction of the rotation. Guide pin 213 is studded in jaw 215 in the indicated instance, and its free end portion slidably extends through a hole provided in the opposite jaw 214 to guide the parting and approaching movements of these jaws. Indexing pin 216 is studded in the embracing face of jaw 215, and is so oriented as to point straight to hole 14a in which the cam which, in the present instance, is a plain drilled hole meant to receive pin 216.

Fixture 210 is for temporarily holding the cam in its indexed position on the shaft after the cam has been indexed according to the method already explained, and is to be removed after the all-around welding as been completed. Thus, set screws for the cams are eliminated in this embodimemt and, moreover, holes 14 can be worked out by an easier machining method, namely, by drilling alone. Holes 14 left behind in the completed camshaft serve as reservoirs of lube oil in service, just as in the previous instance, to help the cam profiles receive improved lubrication.

Still another embodiment is shown in FIG. 7, in which spot welding is made at the indexing hole 14a to finalize the positioning of each cam on shaft 20; neither the holding fixture 210 nor the set screw 15, mentioned above, is required, but the initial setting is again accomplished by a medium inserted through holes 14a. In this method, each cam indexed to shaft 20 is first fixated in place by spot welding in hole 14a, thereby leaving a deposited metal 221 (FIG. 7) in the hole. After so fixating the cam, all-around fillet welding is effected at both sides of the cam to deposit fillets 222 and 223 and thus complete the welding operation required in the last stage of combining the cams with the shaft. This spot welding may be accomplished by using such a spot welder as the one schematically shown as 220 in FIG. 4.

According to the present invention, cam parts and shaft parts are separately prepared by machining as individual parts, which are then assembled into camshafts in the manner substantially described in the foregoing explanations. Since individual parts are easier to machine and lend more readily to mass production, the camshaft manufacturing method according to this invention provides advantages of lowering camshaft production cost and, furthermore, enabling a single production line to meet a wider range of camshaft needs, without necessitating appreciable retooling, for a greater number of engine models. Besides, camshafts according to this invention last longer in service because their cams have an inherent feature of assuring improved lubrication for their profile faces.

I claim:

1. A method of manufacturing a camshaft, comprising the steps of
   a. providing a plurality of parts including cam parts, journal parts and at least one gear part, said parts having shaft-receiving apertures therein;
   b. placing said parts at positions with their shaft-receiving apertures being aligned along a given axis, said parts while in said positions being in the sequence and at the longitudinal spacing desired in the completed camshaft, said journal parts and said gear parts being expanded by heating to enable them to receive a shaft;
   c. moving a shaft longitudinally along said given axis into the apertures of said parts while maintaining the parts in said given spaced relationship;
   d. cooling the journal parts and the gear parts to secure them to the shaft by an interference fit;
   e. holding the cam parts while rotating the shaft to a position where one said cam part is at a desired angular indexed position with respect to the shaft, and temporarily attaching said one said cam part to the shaft while at said desired angular position;
   f. performing step (e) for each of the remaining said cam parts, and,
   g. permanently attaching said cam parts to the shaft by fillet welding both ends of each said cam part to the shaft to form a built-up camshaft.

2. The method of claim 1 wherein step (b) is performed by feeding said parts from groups of said parts, said groups being spaced transversely from said axis.

3. The method of claim 2 wherein there is one said group of parts for each of said positions, and said parts are fed singly in step (b) from each said group to the corresponding said position.

4. The method of claim 3 wherein said groups are at an elevation higher than said positions, said parts being moved by gravity from each said group to the corresponding said position.

5. The method of claim 4 wherein said groups are at an elevation higher than said positions, said parts being moved by gravity from said group to the corresponding said position.

6. The method of claim 1 wherein the temporary attaching of the cam parts during steps (e) and (f) is accomplished by moving a set screw on each said cam part into contact with said shaft.

7. The method of claim 6 including the step performed subsequent to step (g) of removing each set screw to provide at the previous location of the set screw a recess which serves as an oil reservoir during use of the camshaft.

8. The method of claim 7 wherein step (b) is performed by feeding said parts from groups of said parts said groups being located laterally of said axis.

9. The method of claim 8 wherein there is one said group of parts for each of said positions, and said parts are fed singly from each said group to the corresponding said position.

10. The method of claim 9 wherein said groups are at an elevation higher than said positions, said parts being moved by gravity from said group to the corresponding said position.

11. The method of claim 10 including the step of straightening said shaft subsequent to step (g).

* * * * *